United States Patent [19]

Ishikawa et al.

[11] Patent Number: 5,730,917
[45] Date of Patent: Mar. 24, 1998

[54] METHOD FOR MOLDING THE HEADREST OF AN AUTOMOTIVE SEAT

[75] Inventors: Yoshiharu Ishikawa, Yokosuka; Syuzaburo Kimura; Tohru Satoh, both of Yamato; Eiichi Yamano, Ayase; Masatoshi Yasuno, Kawasaki, all of Japan

[73] Assignee: Ikeda Bussan Co., Ltd., Ayase, Japan

[21] Appl. No.: 727,081

[22] Filed: Oct. 8, 1996

[30] Foreign Application Priority Data

Oct. 9, 1995 [JP] Japan .................. 7-286329

[51] Int. Cl.⁶ .................. B29C 44/06; B29C 44/12
[52] U.S. Cl. .................. 264/46.5; 264/46.6; 264/46.7; 264/276; 264/278
[58] Field of Search .................. 264/278, 46.7, 264/46.5, 46.6, 276

[56] References Cited

U.S. PATENT DOCUMENTS

| | | | |
|---|---|---|---|
| 4,908,170 | 3/1990 | Kurimoto | 264/46.7 |
| 5,004,572 | 4/1991 | Kurimoto | 264/46.6 |
| 5,061,419 | 10/1991 | Kouda et al. | 264/46.6 |
| 5,135,593 | 8/1992 | Quirin | 264/46.7 |
| 5,190,707 | 3/1993 | Yanagishita | 264/46.6 |
| 5,478,136 | 12/1995 | Takeuchi et al. | 264/46.7 |
| 5,611,977 | 3/1997 | Takei | 264/46.6 |

FOREIGN PATENT DOCUMENTS

| | | | |
|---|---|---|---|
| 55-158944 | 12/1980 | Japan | 264/46.6 |
| 58-12735 | 1/1983 | Japan | 264/46.6 |
| 60-105505 | 6/1985 | Japan | 264/46.6 |
| 60-154015 | 8/1985 | Japan | 264/46.6 |
| 2 298 389 | 9/1996 | United Kingdom . | |

OTHER PUBLICATIONS

WPI Abstract Accession No. 96–420780/42 & JP 8207061A (Tachi–s) Aug. 13, 1996.
WPI Abstract Accession No. 89–027424/04 & JP 63299908A (MTP) Dec. 7, 1988.

Primary Examiner—Allan R. Kuhns
Attorney, Agent, or Firm—Foley & Lardner

[57] ABSTRACT

A method of molding a headrest of automotive seat comprises the following steps. First, a bag shaped flexible outer skin member is prepared, has an elongate slit formed therethrough. A part of a stay member is inserted into the outer skin member through the slit and set relative to the outer skin member. A given biasing force is applied to longitudinal ends of the slit so that the slit is stretched in longitudinally opposed directions and thus caused to take a closed position. Then, an injection nozzle of a foamable material feeder is put into the slit by expanding the slit against the biasing force. A foamable material is poured into the outer skin member, and the material feeding is stopped when a given amount of material is fed to the outer skin member. The application of the biasing force to the slit is continued until the material is sufficiently cured.

5 Claims, 5 Drawing Sheets

METHOD FOR MOLDING THE HEADREST OF AN AUTOMOTIVE SEAT

BACKGROUND OF THE INVENTION

1. Field of the invention

The present invention relates in general to a method and a mold unit for molding a headrest of an automotive seat, and more particularly to a method and a mold unit for molding the headrests of a type which comprises a foamed plastic body covered with a plastic skin member.

2. Description of the Prior Art

For clarifying the task of the present invention, two conventional molding methods for molding a headrest will be briefly described with reference to some of the accompanying drawings.

In FIGS. 6(A) and 6(B), there is depicted one conventional molding method. Before carrying out the molding, two major elements for the headrest are prepared, one being a bag-shaped outer skin member 1 made of a soft plastics, and the other being a U-shaped stay member 2 made of a metal rod. The bag-shaped outer skin member 1 has three circular openings 1a, 1b and 5. The outer skin member 1 has further an elongate slit 4 which extends along a longitudinal axis of the bag-shaped outer skin member 1. The slit 4 is equipped at an inner edge portion thereof with a fastener 3. The U-shaped metal stay member 2 comprises two pole portions 2a and 2b and a bridge portion 2c which are united to form a generally U-shaped structure as shown.

Molding of the headrest is carried out in the following manner.

First, the bag-shaped outer skin member 1 is put into a mold unit (not shown) which is kept open. Then, with the slit 4 kept open, the pole portions 2a and 2b of the stay member 2 are led into the bag-shaped outer skin member 1 through the slit 4, and then drawn to the outside of the outer skin member 1 through the openings 1a and 1b remaining the bridge portion 2c in the outer skin member 1 as shown in FIG. 6(A). Then, the slit 4 is closed by the fastener 3 and then, as is shown in FIG. 6(B), an injection nozzle 100 of a urethane material feeder (not shown) is put into the opening 5 of the outer skin member 1 for pouring a given amount of foamable urethane material into the outer skin member 1. Upon completion of the material pouring, the injection nozzle 100 is pulled out and instantly the opening 5 of the outer skin member 1 is closed by a separate cover member (not shown). Then, the mold unit is closed by a lid member with the material-filled outer skin member 1 left therein. Then, the entire of the mold unit is put into an oven for sufficiently curing the urethane material in the bag-shaped outer skin member 1.

In FIGS. 7(A) and 7(B), there is shown the other conventional molding method. In this method, a different bag-shaped outer skin member 1' is used. That is, the bag-shaped outer skin member 1' has only two circular openings 1'a and 1'b which are for the pole portions of the stay member 2. Similar to the above-mentioned method, an elongate slit 7 is formed in the outer skin member 1'. However, in the outer skin member 1' employed in this method, there is provided an elongate lip 6 which extends along the slit 7 to cover the same. The lip 6 is equipped with a fastener.

Molding of the headrest is carried out in the following manner.

First, the bag-shaped outer skin member 1' is put into a mold unit (not shown) which is kept opened. Then, similar to the above-mentioned method, through the slit 7 kept open, the stay member 2 is put into and set in the bag-shaped outer skin member 1' in such a manner as shown in FIG. 7(A). Then, an injection nozzle of a material feeder is put into the slit 7 for pouring the material into the outer skin member 1'. Upon completion of the material pouring, the injection nozzle 100 is pulled out and instantly the slit 7 is closed by the lip 6. Then, the mold unit is closed by a lid member. Thereafter, the entire of the mold unit is put into an oven for curing the urethane material in the bag-shaped outer skin member 1'.

However, due to their inherency, the above-mentioned two conventional molding methods have failed to provide users with satisfaction in obtaining desired headrests. That is, in the former method, a separate cover member is needed for closing the opening 5 and for assuring the closing, the cover member should be bonded to the outer skin member 1 with a suitable adhesive, which causes troublesome molding steps of the method. While, in the latter method, due to a marked pressure produced during foaming of the urethane material, the elongate lip 6 tends to have an uglily waved appearance upon completion of the foaming. In fact, as is indicated by a broken line in FIG. 7(B), the pressure produced in the outer skin member 1' tends to raise and thus open a part of the elongate lip 6.

SUMMARY OF THE INVENTION

It is therefore an object of the present invention to provide a method for molding a headrest, which is free of the above-mentioned drawbacks.

It is another object of the present invention to provide a mold unit through which the method is smoothly carried out.

According to the present invention, there is provided a method of molding a headrest of automotive seat, which comprises the steps of (a) preparing a bag shaped outer skin member which is flexible, the outer skin member having an elongate slit formed therethrough; (b) inserting a part of a stay member in the outer skin member through the slit and setting the stay member relative to the outer skin member; (c) applying a given biasing force to longitudinal ends of the slit so that the slit is stretched in longitudinally opposed directions and thus caused to take a closed position; (d) putting an injection nozzle of a foamable material feeder into the slit by expanding the slit against the biasing force; (e) pouring a foamable material into the outer skin member through the slit; and (f) stopping the material feeding when a given amount of the material is fed to the outer skin member, wherein the application of the biasing force to the slit is continued until the material is sufficiently cured.

According to the present invention, there is provided a mold unit of molding a headrest of automotive seat, which comprises a receptacle body having an open portion; a lid member pivotally connected to the receptacle body to selectively close the open portion of the same; and a pair of tensioning devices which are mounted on laterally opposed portions of the receptacle body, each tensioning device being capable of stretching a given portion of a bag-shaped flexible outer skin member in the receptacle body in a given direction.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
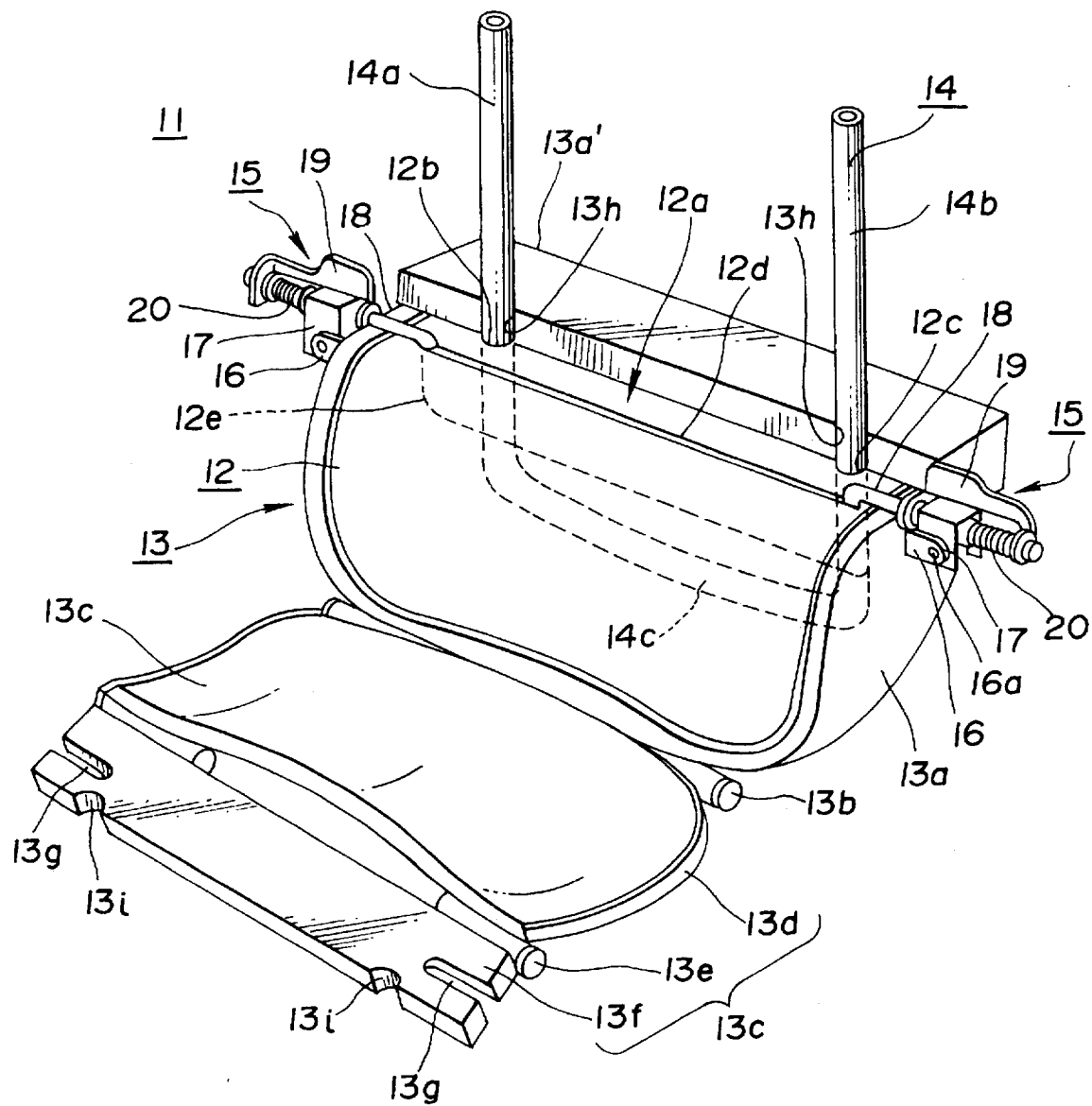
FIG. 1 is a perspective view of a mold unit through which a method of a first embodiment of the present invention is practically carried out.
Figure 2:
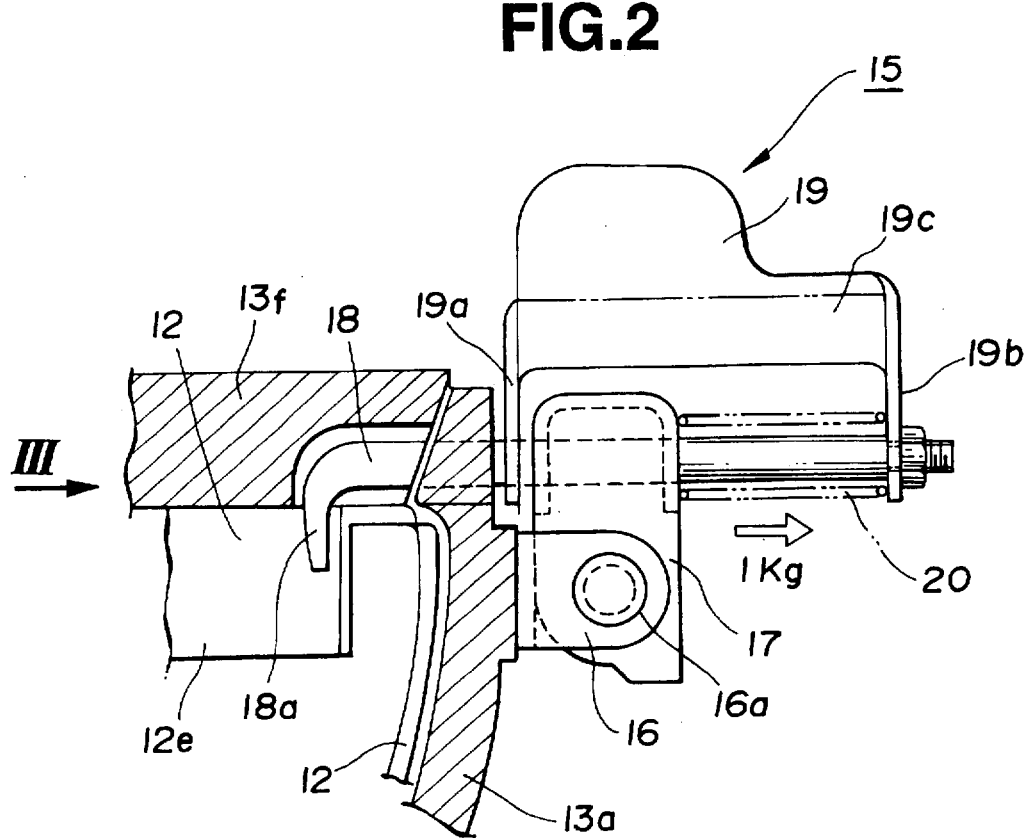
FIG. 2 is an enlarged view of one of tensioning devices mounted to the mold unit of FIG. 1.
Figure 3:
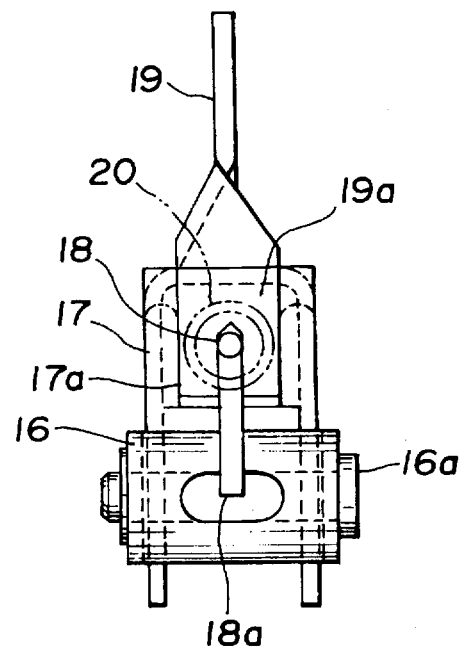
FIG. 3 is a view taken from the direction of the arrow "III" of FIG. 2.

Referring to FIGS. 1 to 3, particularly FIG. 1, there is shown a mold unit 11 through which a method of a first embodiment of the present invention is practically carried out.

The mold unit 11 comprises generally a mold 13 and two tensioning devices 15. As will be described in detail hereinafter, the mold 13 is a lid-mounted receptacle member for holding a bag-shaped outer skin member 12.

The bag-shaped outer skin member 12 is made of a flexible plastics. The outer skin member 12 is formed at a given portion 12a thereof with two circular openings 12b and 12c. It is to be noted that the given portion 12a faces downward when a headrest thus produced is properly mounted on a seatback (not shown). The given portion 12a is further formed with a slit 12d which extends straightly in parallel with an imaginary line which connects the two circular openings 12b and 12c. The slit 12d is formed with an inwardly projected slender sleeve 12e.

As will be described in detail hereinafter, the slit 12d serves as both a stay insertion opening through which a stay member 14 is led into the outer skin member 12 and a material inlet opening through which a foamable urethane material is poured into the outer skin member 12.

The stay member 14 is of a generally U-shaped metal member. That is, the U-shaped metal stay member 14 comprises two pole portions 14a and 14b and a bridge portion 14c which are united to form a generally U-shaped structure.

As is seen from FIG. 1, the mold 13 comprises a receptacle body 13a having a smoothly curved cavity formed therein. As shown, the receptacle body 13a has front and upper portions opened to the outside. An upper rear wall 13a' of the receptacle body 13a is formed at a front edge thereof with two semicircular recesses 13h.

A lid member 13c is pivotally connected through hinges 13b to a front lower portion of the receptacle body 13a to selectively close the front and upper open portions of the same.

The lid member 13c comprises a front plate portion 13d for covering the front open portion of the receptacle body 13a and an upper plate portion 13f for covering the upper open portion of the receptacle body 13a. As shown, the front plate portion 13d has at a lower end thereof the hinges 13b, and the upper plate portion 13f is pivotally connected to the front plate portion 13d through hinges 13e. The upper plate portion 13f is formed at a front edge thereof with two semicircular recesses 13i. As will become clarified hereinafter, when the lid member 13c properly covers the receptacle body 13a, the recesses 13i of the lid member 13c are mated with the recesses 13h of the receptacle body 13a respectively to constitute two circular openings through which the two pole portions 14a and 14b of the U-shaped metal stay member 14 are to be projected to the outside. For the reason which will be clarified hereinafter, the upper plate portion 13f is formed at lateral ends thereof respective slots 13g.

The receptacle body 13a is provided at lateral ends thereof with respective tensioning devices 15. It is to be noted that each tensioning device 15 is positioned on a longitudinal axis of the slit 12d of the bag-shaped outer skin member 12 which is properly put in the receptacle body 13a. If desired, one of the tensioning devices 15 may be removed.

As is well shown in FIGS. 2 and 3, each tensioning device 15 comprises a bracket 16 secured to the lateral end of the receptacle body 13a. A pivotal arm 17 is pivotally connected to the bracket 16 through a pivot pin 16a. The pivotal arm 17 is formed with a guide slot 17a in which a slide rod 18 is slidably received. As is seen from FIG. 3, the slide rod 18 is a thin member having a rectangular cross section. The slide rod 18 has an inner end portion shaped like a hook 18a. As will become apparent hereinafter, the hook 18a is engageable with a longitudinal end of the slit 12d of the bag-shaped outer skin member 12 held in the receptacle body 13a.

For biasing the slide rod 18 outward, that is, in a rightward direction in FIG. 2, a biasing mechanism is incorporated with the slide rod 18. The mechanism comprises a generally U-shaped holder 19 and a coil spring 20. That is, the U-shaped holder 19 comprises two spaced arm portions 19a and 19b each having an opening through which the slide rod 18 slidably passes, and a bridge portion 19c through which the two arm portions 19a and 19b are connected. The coil spring 20 is disposed about the slide rod 18 and compressed between the arm portion 19b and the pivotal arm 17. An outer end of the slide rod 18 has a nut 18b connected thereto. Due to a biasing force produced by the coil spring 20 the nut 18b is pressed against an outer surface of the arm portion 19b. It is to be noted that under an operative condition as shown in FIG. 2, a biasing force of about 1 Kg. is produced by the coil spring 20. With the above-mentioned arrangement using the pivot pin 16a, each tensioning device 15 can pivot between a horizontal operative position wherein as shown in FIG. 1 the slide rod 18 extends horizontally toward the inside of the mold unit 11 and a vertical rest position wherein the slide rod 18 extends vertically upward.

Molding a headrest by using the mold unit 11 is carried out in the following manner.

The bag-shaped outer skin member 12, the U-shaped metal stay member 14 and the mold unit 11 are prepared. Before molding, the mold unit 11 is handled to assume such an open condition that the lid member 13c is opened and each tensioning device 15 takes the rest position wherein the slide rod 18 extends vertically upward.

First, with the slit 12d of the outer skin member 12 kept open, the pole portions 14a and 14b of the stay member 14 are led into the outer skin member 12 through the slit 12d, and then drawn to the outside of the outer skin member 12 through the circular openings 12b and 12c of the outer skin member 12 remaining the bridge portion 14c in the outer skin member 12.

Then, the bag-shaped outer skin member 12, together with the U-shaped metal stay member 14 installed therein, is put into the receptacle body 13a of the mold unit 11. Positioning of the outer skin member 12 is so made that the two pole portions 14a and 14b of the U-shaped stay member 14 are neatly put into the recesses 13h of the receptacle body 13a. With this, the outer skin member 12 is properly set in the receptacle body 13a with the longitudinal ends of the slit 12d directed toward the tensioning devices 15.

Then, the two tensioning devices 15 are handled to take the horizontal operative positions as shown in FIG. 1. During this step, the hook portion 18a of each slide rod 18 is brought into engagement with the corresponding longitudinal end of the slit 12d of the outer skin member 12 against the force of the coil spring 20. Thus, upon release of the operator's hands from the tensioning devices 15, the longitudinal ends of the slit 12d are pulled or biased outward by the tensioning devices 15. That is, the slit 12d is stretched longitudinally. Under this condition, the slit 12d is closed. Because of the tensioning work of the tensioning devices 15, the bag-shaped outer skin member 12 is forced to take a proper set position relative to the receptacle body 13a. That is, centering of the outer skin member 12 relative to the receptacle body 13a is achieved.

Then, the slit 12d is opened by the operator's hands to put an injection nozzle of a urethane material feeder thereinto, and then a given amount of urethane material is poured into the bag-shaped outer skin member 12. Upon completion of the material pouring, the injection nozzle is pulled out from the slit 12d. Upon this, the slit 12d is instantly closed due to the stretching force produced by the tensioning devices 15. Thus, initial curing or foaming of the material in the outer skin member 12 is carried out without suffering a leakage of the material through the slit 12d.

Then, the lid member 13c is handled to cover the open portions of the receptacle body 13a and then the entire of the mold unit 11 is put into an oven for sufficiently curing the urethane material. It is to be noted that due to presence of the slots 13g in which the slide rods 18 can be received, the lid member 13c can be neatly put on the receptacle body 13a.

Upon completion of the curing, the lid member 13c is handled to open the mold unit 11 and then, the two tensioning devices 15 are handled to assume their rest positions. Thus, upon this, the hook portions 18a of the slide rods 18 are released from the longitudinal ends of the slit 12d of the outer skin member 12. Then, the product, that is, the produced headrest is released from the opened mold unit 11.

In the following, advantages of the above-mentioned first embodiment of the invention will be described.

Due to function of the tensioning devices 15, the slit 12d of the bag-shaped outer skin member 12 in the mold unit 11 is kept biased to take its closed position. Thus, during curing or foaming of the material, undesired leakage of the urethane material from the slit 12d is suppressed.

Second, during curing of the material, the slit 12d of the outer skin member 12 is kept stretched longitudinally by the tensioning devices 15. The stretched condition of the slit 12d prevents formation of an uglily waved appearance of the same upon completion of the molding. In fact, several tests revealed that the produced headrest exhibited an excellent external appearance around the slit 12d.

If desired, the following modifications may be employed in the invention.

In place of the pivotal arm 17 of each tensioning device 15, a vertically movable supporting member may be employed. That is, in this modification, the supporting member is vertically movably disposed on the bracket 16, and a biasing mechanism including the slide rod 18, the coil spring 20 and the U-shaped holder 19 is mounted on the supporting member.

In place of the coil spring 20, other biasing members may be used, which are for example a rubber sleeve, air spring and the like.

Figure 4:
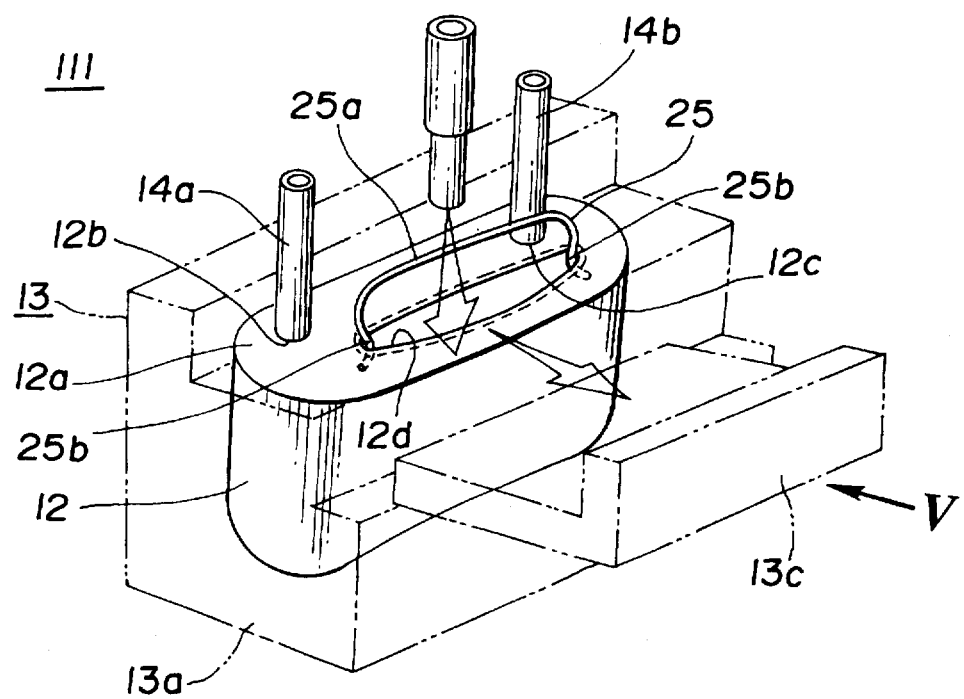
FIG. 4 is a perspective view of another mold unit through which a method of a second embodiment of the invention is practically carried out.
Figure 5:
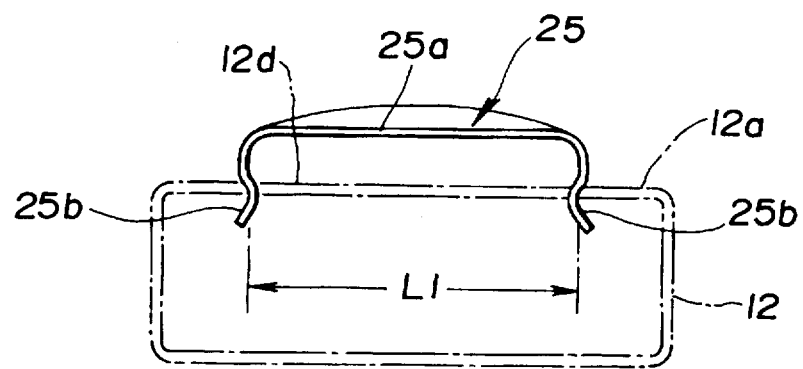
FIG. 5 is a view taken from the direction of the arrow "V" of FIG. 4, showing an expanding piece operatively incorporated with a bag-shaped outer skin member.
Figure 6A:
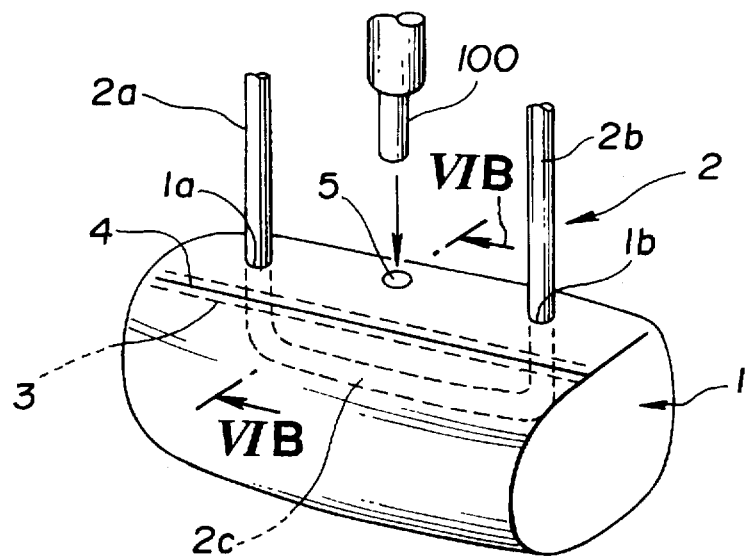
FIGS. 6A and 6B are views depicting a first conventional method for molding a headrest.
Figure 6B:
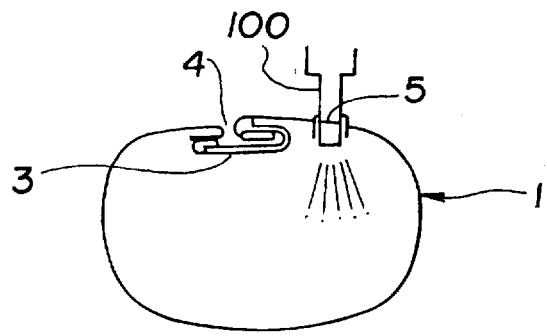
Figure 7A:
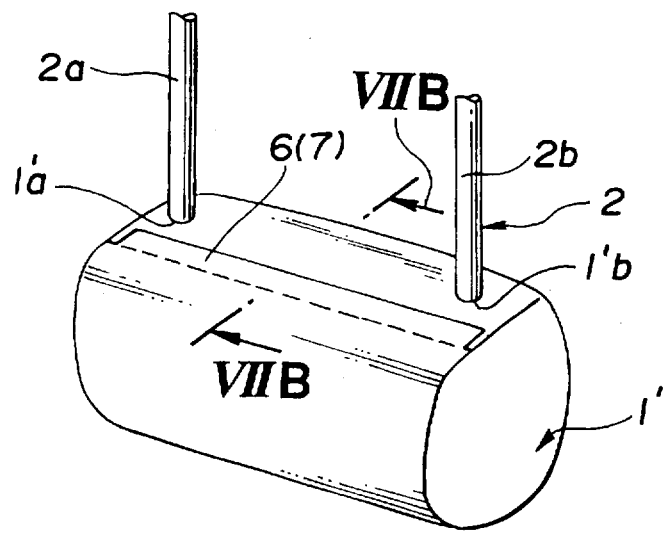
FIGS. 7A and 7B are views depicting a second conventional method for molding the headrest.
Figure 7B:
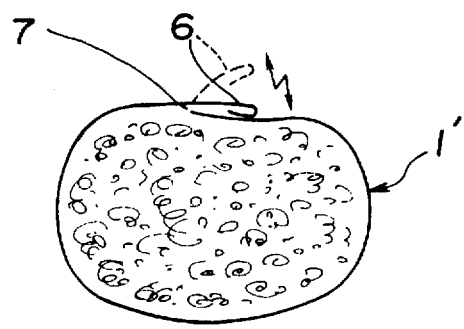

Referring to FIGS. 4 and 5, there is schematically shown another mold unit 111 through which a method of a second embodiment of the present invention is practically carried out.

Although illustrated different in FIG. 4, the mold unit 111 is substantially the same as the above-mentioned mold unit 11 except for the tensioning devices. Thus, substantially same parts as those of the mold unit 11 are denoted by the same reference numerals.

That is, the mold unit 111 is not equipped with devices corresponding to the tensioning devices 15 of the mold unit 11. That is, in the second embodiment, a separate expanding piece 25 is used in place of the tensioning devices 15 employed in the first embodiment. That is, the expanding piece 25 is not fixed to the mold unit 11.

As is seen from FIG. 5, the expanding piece 25 is made of a generally U-shaped spring wire, which comprises a center elongate part 25a and two side hook parts 25b. Each side hook part 25b has a portion depressed inward. When in a non-stressed condition of the expanding piece 25, the length of the same (that is, the distance between the two side hook parts 25b) is somewhat greater than the length "L1" of the slit 12d of the bag-shaped outer skin member 12.

Molding a headrest by using the mold unit 111 is carried out in the following manner.

First, with the slit 12d of the outer skin member 12 kept open, the pole portions 14a and 14b of the stay member 14 are led into the outer skin member 12 through the slit 12d, and then drawn to the outside through the circular openings 12b and 12c of the skin member 12 remaining the bridge portion 14c in the skin member 12.

Then, the bag-shaped outer skin member 12, together with the U-shaped metal stay member 14 left therein, is put into the receptacle body 13a of the mold unit 11.

Then, the expanding piece 25 is fitted to the slit 12d in such a manner that the two side hook parts 25b thereof are pressed against the longitudinal ends of the slit 12d. Thus, upon this, the longitudinal ends of the slit 12d are pulled or biased outward by the expanding piece 25. That is, the slit 12d is stretched longitudinally and thus urged to be closed.

Then, the slit 12d is opened by the operator's hands to put an injection nozzle of a urethane material feeder thereinto, and then a given amount of urethane material is poured into the bag-shaped outer skin member 12. Upon completion of the material feeding, the injection nozzle is pulled out from the slit 12d. Upon this, the slit 12d is instantly closed due to the stretching force produced by the expanding piece 25.

Then, the lid member 13c is handled to cover the open portions of the receptacle body 13a with the expanding piece 25 kept engaged with the slit 12d and then the entire of the mold unit 11 is put into an oven for sufficiently curing the urethane material.

Upon completion of the curing, the lid member 13c is opened to remove the product (viz., the produced headrest) from the receptacle body 13a. Then, the expanding piece 25 is removed from the product.

Due to usage of the expanding piece 25 by which the slit 12d is stretched longitudinally, substantially same advantages as those of the first embodiment are obtained in the second embodiment.

What is claimed is:

1. A method of molding a headrest of an automotive seat, comprising the steps of:

(a) preparing a bag shaped outer skin member which is flexible, said outer skin member having an elongate slit formed therethrough;

(b) inserting a part of a stay member in said outer skin member through said slit and setting said stay member relative to said outer skin member;

(c) applying a given biasing force to longitudinal ends of said slit so that said slit is stretched in longitudinally opposed directions and thus caused to take a closed position;

(d) putting an injection nozzle of a foamable material feeder into said slit by expanding said slit against the biasing force;

(e) pouring a foamable material into said outer skin member through said slit; and (f) stopping the material feeding when a given amount of the material is fed to the outer skin member, wherein the application of the biasing force to said slit is continued until the material is sufficiently cured.

2. A method as claimed in claim 1, further comprising between the steps (b) and (c), (b') putting said outer skin member together with the stay member held thereby into a mold unit.

3. A method as claimed in claim 2, in which the application of the biasing force to said slit is achieved by tensioning devices mounted on said mold unit.

4. A method as claimed in claim 1, in which the application of the biasing force to said slit is achieved by a separate expanding piece made of a spring wire.

5. A method as claimed in claim 1, in which said given biasing force is so determined as to avoid undesired expanding movement of said slit caused by foaming action of the foamable material in said outer skin member.

* * * * *